US009853461B2

(12) United States Patent
Kubota et al.

(10) Patent No.: US 9,853,461 B2
(45) Date of Patent: Dec. 26, 2017

(54) BALANCE CORRECTION APPARATUS AND ELECTRIC STORAGE SYSTEM

(71) Applicant: EVTD Inc., Tokyo (JP)

(72) Inventors: Haruhiko Kubota, Kanagawa (JP); Fumiaki Nakao, Shizuoka (JP); Makoto Inoue, Kanagawa (JP)

(73) Assignee: EVTD Inc., Tokyo (JP)

( * ) Notice: Subject to any disclaimer, the term of this patent is extended or adjusted under 35 U.S.C. 154(b) by 219 days.

(21) Appl. No.: 14/876,770

(22) Filed: Oct. 6, 2015

(65) Prior Publication Data

US 2016/0028256 A1 Jan. 28, 2016

Related U.S. Application Data

(63) Continuation of application No. PCT/JP2014/002045, filed on Apr. 9, 2014.

(30) Foreign Application Priority Data

Apr. 9, 2013 (JP) .................. 2013-081623
Apr. 9, 2013 (JP) .................. 2013-081624

(51) Int. Cl.
*H02J 7/00* (2006.01)

(52) U.S. Cl.
CPC .......... *H02J 7/0014* (2013.01); *H02J 7/0016* (2013.01); *H02J 7/0021* (2013.01); *Y02T 10/7055* (2013.01)

(58) Field of Classification Search
CPC .................................................. H02J 7/0016
(Continued)

(56) References Cited

U.S. PATENT DOCUMENTS 5,528,122 A * 6/1996 Sullivan ................ H02J 7/0018
320/118
6,373,223 B1 * 4/2002 Anzawa ................ H02J 7/0018
320/116
(Continued)

FOREIGN PATENT DOCUMENTS

CN 103023351 A 4/2013
CN 202856396 U 4/2013
(Continued)

OTHER PUBLICATIONS

Office Action issued for counterpart Japanese Application 2013-081623, issued by the Japan Patent Office dated Jan. 31, 2017.
International Search Report for International Application No. PCT/JP2014/002045, issued by the Japan Patent Office dated Jun. 3, 2014.
(Continued)

*Primary Examiner* — Yalkew Fantu

(57) ABSTRACT

It is preferable to measure a voltage difference between two electric storage cells with a higher precision while suppressing costs of a balance correction circuit. A balance correction apparatus comprises a first balance correction section which equalizes voltages of two electric storage cells among a plurality of electric storage cells connected in series, a second balance correction section which equalizes voltages of two electric storage cells among the plurality of electric storage cells and a control section which controls operations of the first balance correction section and the second balance correction section. The control section generates a first control signal which controls operations of the first balance correction section and a second control signal which controls operations of the second balance correction section based on a measurement result of each voltage of the plurality of electric storage cells.

16 Claims, 5 Drawing Sheets

(58) Field of Classification Search
USPC .......................................................... 320/118
See application file for complete search history.

(56) References Cited

U.S. PATENT DOCUMENTS

| | | | | |
|---|---|---|---|---|
| 6,670,789 | B2* | 12/2003 | Anzawa | H02J 7/0018 |
| | | | | 320/116 |
| 6,867,567 | B2* | 3/2005 | Yokota | H02J 7/0047 |
| | | | | 320/134 |
| 2004/0135544 | A1* | 7/2004 | King | B60L 11/185 |
| | | | | 320/116 |
| 2004/0135546 | A1* | 7/2004 | Chertok | B60L 11/185 |
| | | | | 320/118 |
| 2010/0253286 | A1 | 10/2010 | Sutardja | |
| 2011/0109270 | A1* | 5/2011 | Nakao | H01M 10/441 |
| | | | | 320/116 |

FOREIGN PATENT DOCUMENTS

| | | |
|---|---|---|
| EP | 2506390 A1 | 10/2012 |
| JP | 2006-067742 A | 3/2006 |
| JP | 2008-017605 A | 1/2008 |
| JP | 2009-232660 A | 10/2009 |
| JP | 2010-154628 A | 7/2010 |
| JP | 2014-39435 A | 2/2014 |
| WO | 2005/031943 A1 | 4/2005 |

OTHER PUBLICATIONS

International Preliminary Report on Patentability for International Application No. PCT/JP2014/002045, issued by the International Bureau of WIPO dated Oct. 22, 2015.

Notice of First Office Action for Patent Application No. 201480018736.X, issued by the State Intellectual Property Office of the People's Republic of China dated Jul. 4, 2017.

* cited by examiner

BALANCE CORRECTION APPARATUS AND ELECTRIC STORAGE SYSTEM

The contents of the following Japanese patent applications are incorporated herein by reference:
NO. 2013-081623 filed on Apr. 9, 2013, and
NO. 2013-081624 filed on Apr. 9, 2013.
The contents of the following PCT patent application are incorporated herein by reference:
NO. PCT/JP2014/002045 filed on Apr. 9, 2014.

BACKGROUND

1. Technical Field

The present invention is related to a balance correction apparatus and an electric storage system.

2. Related Art

When using a plurality of electric storage cells connected in series, once a variation in voltages between the electric storage cells occurs, a capacity of the electric storage cells cannot be used effectively and a usable electric quantity is decreased in some cases. In recent years, a balance correction circuit with an active system is proposed to equalize voltages between electric storage cells while suppressing an electric power loss (refer to patent documents 1-4).
Patent Document 1: Japanese Application Publication No. 2006-067742
Patent Document 2: Japanese Application Publication No. 2008-017605
Patent Document 3: Japanese Application Publication No. 2009-232660
Patent Document 4: Japanese Application Publication No. 2012-210109

SUMMARY

It is preferable to measure a voltage difference between two electric storage cells with a higher precision while suppressing costs of the balance correction circuit. Here, one aspect of the present invention is to provide a balance correction apparatus and an electric storage system to solve the above problem. This purpose can be achieved by combinations of features described in independent claims of the claims. Also, further advantageous examples of the present invention are described in dependent claims.

Also, sometimes SOC is different between a plurality of batteries connected in series and an electric charge transfer by a part of balance correction circuits becomes unnecessary according to the SOC values of the plurality of batteries. Here, one aspect of the present invention is to provide a balance correction apparatus and an electric storage system to solve the above problem. This purpose can be achieved by combinations of features described in independent claims of the claims. Also, further advantageous examples of the present invention are described in dependent claims.

A first embodiment of the present invention provides a balance correction apparatus comprising a first balance correction section which equalizes voltages of two electric storage cells among a plurality of electric storage cells connected in series, a second balance correction section which equalizes voltages of two electric storage cells among the plurality of electric storage cells and a control section which controls operations of the first balance correction section and the second balance correction section, wherein the control section generates a first control signal which controls operations of the first balance correction section and a second control signal which controls operations of the second balance correction section based on a measurement result of each voltage of the plurality of electric storage cells.

In the above balance correction apparatus, the first balance correction section may equalize voltages of a first electric storage cell and a second electric storage cell included in the plurality of electric storage cells and the second balance correction section may equalize voltages of the first electric storage cell and the second electric storage cell. The first balance correction section and the second balance correction section may connect electrically to the first electric storage cell and the second electric storage cell respectively so that the first balance correction section, the second balance correction section, the first electric storage cell and the second electric storage cell connect in parallel, wherein the first electric storage cell and the second electric storage cell are connected in series.

A second embodiment of the present invention provides a computer readable medium which stores a program for a balance correction apparatus, wherein the program makes a computer function as a control section of the balance correction apparatus. A program for making a computer function as the control section of the balance correction apparatus may be provided. The program may be a program for making a computer conduct a procedure of generating a first control signal and a second control signal based on a measurement result of each voltage of a plurality of electric storage cells, wherein the computer is to control operations of a balance correction circuit comprising a first balance correction section which equalizes voltages of two electric storage cells among a plurality of electric storage cells connected in series and a second balance correction section which equalizes voltages of two electric storage cells among the plurality of electric storage cells, the first control signal controls operations of a first balance correction section, and the second control signal controls operations of a second balance correction section.

A third embodiment of the present invention provides a balance correction apparatus comprising a first balance correction section which equalizes voltages of a first electric storage cell and a second electric storage cell connected in series based on a first control signal, a second balance correction section which equalizes voltages of the first electric storage cell and the second electric storage cell based on a second control signal. The first balance correction section and the second balance correction section connect electrically to the first electric storage cell and the second electric storage cell respectively so that the first balance correction section, the second balance correction section, the first electric storage cell and the second electric storage cell connect in parallel, wherein the first electric storage cell and the second electric storage cell are connected in series.

In the above balance correction apparatus, the first control signal and the second control signal may be generated respectively so that a first current and a second current have different waveforms or phases from each other, wherein the first current flows through a connection point of the first electric storage cell and the second electric storage cell via the first balance correction section and the second current flows through the connection point of the first electric storage cell and the second electric storage cell via the second balance correction section. The first control signal and the second control signal may be generated respectively so that a phase difference between the first current and the second current becomes 360 degrees/N, wherein the N is a number of the balance correction sections connected to the first electric storage cell and the second electric storage cell in parallel. The first control signal and the second control signal may respectively include operation mode selection signals which prescribe operation modes of the first balance correction section and the second balance correction section respectively.

A four embodiment of the present invention provides an electric storage system comprising a first electric storage cell and a second electric storage cell which are connected in series and the above balance correction apparatus which equalizes voltages of the first electric storage cell and the second electric storage cell. The electric storage system may further comprise a plurality of electric storage cells connected in series, which include the first electric storage cell and the second electric storage cell, and a voltage measurement section measuring each voltage of the plurality of electric storage cells.

A five embodiment of the present invention provides a balance correction apparatus comprising a first balance correction section which equalizes voltages of two electric storage cells among a plurality of electric storage cells connected in series, a second balance correction section which equalizes voltages of two electric storage cells among the plurality of electric storage cells and a control section which controls operations of the first balance correction section and the second balance correction section, wherein the control section generates a first control signal which controls operations of the first balance correction section and a second control signal which controls operations of the second balance correction section based on each SOC (State Of Charge) of the plurality of electric storage cells.

In the above balance correction apparatus, the first balance correction section may equalize voltages of a first electric storage cell and a second electric storage cell included in the plurality of electric storage cells and a negative electrode of the first electric storage cell may be connected to a positive electrode of the second electric storage cell. The control section may compare a first value with a second value, wherein the first value is obtained by averaging SOC values of one or more of electric storage cells among the plurality of electric storage cells, which is or are disposed between an end part of a positive electrode side of the plurality of electric storage cells and a connection point of the first electric storage cell and the second electric storage cell, and the second value is obtained by averaging SOC values of one or more of electric storage cells among the plurality of electric storage cells, which is or are disposed between an end part of a negative electrode side of the plurality of electric storage cells and the connection point of the first electric storage cell and the second electric storage cell. The control section may generate a first control signal based on a result of the comparison.

In the above balance correction apparatus, the control section may generate the first control signal so that a voltage or SOC of the first electric storage cell becomes decreased and a voltage or SOC of the second electric storage cell becomes increased when the first value is larger than the second value.

In the balance correction apparatus, the control section ma generate the first control signal so that operations of the first balance correction section becomes stopped when the first value is larger than the second value and the SOC value of the first electric storage cell is smaller than the SOC value of the second electric storage cell.

A six embodiment of the present invention provides a computer readable medium which stores a program for a balance correction apparatus, wherein the program makes a computer function as a control section of the balance correction apparatus. The program for making a computer function as a control section of the balance correction apparatus may be provided. The program may be a program for making a computer conduct a procedure of generating the first control signal controlling operations of the first balance correction section and the second control signal controlling operations of the second balance correction section based on each SOC of the plurality of electric storage cells, wherein the computer is for controlling operations of the balance correction circuit which comprises the first balance correction section and the second balance correction section, and wherein the first balance correction section equalizes voltages of two electric storage cells among the plurality of electric storage cells connected in series and the second balance correction section equalizes voltages of two electric storage cells among the plurality of electric storage cells.

A seven embodiment of the present invention provides an electric storage system comprising a plurality of electric storage cells connected in series and the above balance correction apparatus which equalizes voltages of the plurality of electric storage cells. The electric storage system may further comprise a voltage measurement section which measures each voltage of the plurality of electric storage cells.

Further, the summary clause does not necessarily describe all necessary features of the embodiments of the present invention. Also, the present invention may be also a sub-combination of the features described above.

DESCRIPTION OF EXEMPLARY EMBODIMENTS

Figure 1:
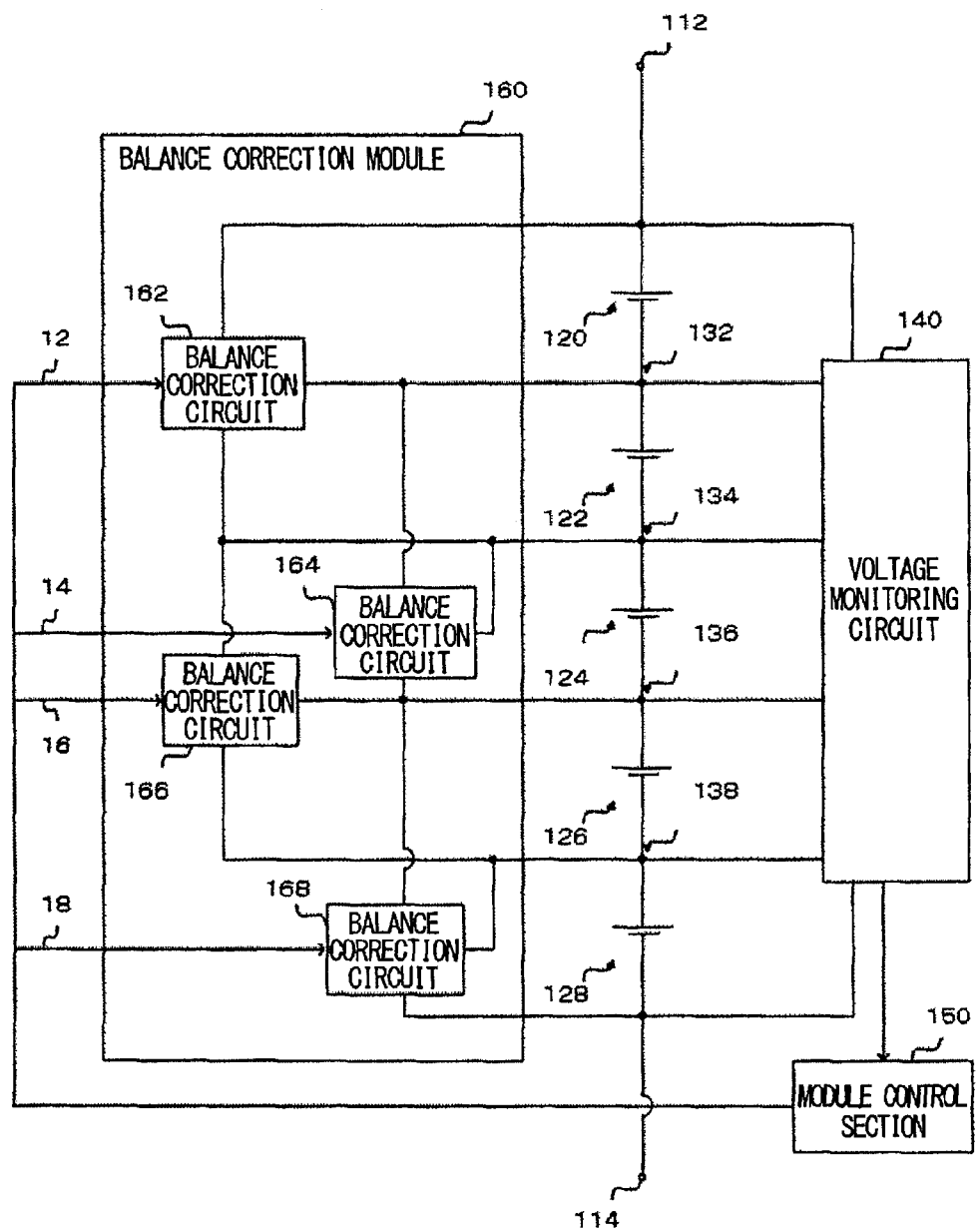
FIG. 1 shows an example of an internal configuration of an electric storage system 100 schematically.

Hereinafter, some embodiments of the present invention will be described. The embodiments do not limit the invention according to the claims. All the combinations of the features described in the embodiments are not necessarily essential to means provided by aspects of the invention. Also, the embodiments will be described by referring to the drawings. Regarding description of the drawings, the same reference numerals will be used in the same or similar parts and the same description is omitted in some cases.

FIG. 1 shows an example of the internal configuration of the electric storage system 100 schematically. The electric storage system 100 is connected to a load such as a motor and the like (not shown in the drawings) electrically and supplies an electric power to the load (referred to a discharge of an electric storage system in some cases). The electric storage system 100 is connected to a charging apparatus (not shown in the drawings) electrically and stores electrical energy (referred to a charge of an electric storage system in some cases). The electric storage system 100 is used in, for example, a transportation apparatus such as an electric car, a hybrid car, an electric motorcycle, a railway vehicle, an airplane, a lifting device and the like or an electrical apparatus such as a PC, a cell phone and the like.

In the present embodiment, the electric storage system 100 comprises an external terminal 112, an external terminal 114, and electric storage cell 120, an electric storage cell 122, an electric storage cell 124, an electric storage cell 126, an electric storage cell 128, a voltage monitoring circuit 140, a module control section 150 and a balance correction module 160. The balance correction module 160 comprises a balance correction circuit 162, a balance correction circuit 164, a balance correction circuit 166 and a balance correction circuit 168.

The electric storage cell 120 to the electric storage cell 128 may be examples of a plurality of electric storage cells or N of electric storage cells, wherein the N is an integer equal to or more than three. The voltage monitoring circuit 140 may be an example of the voltage measurement section. The module control section 150 may be an example of the control section. Each of the balance correction module 160 and the balance correction circuit 162 to the balance correction circuit 168 may be an example of the balance correction apparatus. Each of the balance correction circuit 162 to balance correction circuit 168 may be an example of the first balance correction section or the second balance correction section. The balance correction circuit 162 to the balance correction circuit 168 may be examples of a plurality of balance correction sections or N of balance correction sections, wherein the N is an integer equal to or more than two.

Here, the phrase "connected electrically" is not limited to a case that a specific element and another element are connected to each other directly. A third element may intervene between the specific element and the other element. Also, the specific element and the other element are not limited to be connected to each other physically. For example, an input winding and an output winding of a transformer are not connected to each other physically, but are connected to each other electrically. Further, it includes not only a case that the specific element and the other element are electrically connected to each other actually but also a case that the specific element and the other element are connected to each other electrically when an electric storage cell and a balance correction circuit are connected to each other electrically. Also, the phrase "connected in series" indicates that the specific element and the other element are connected in series electrically, and the phrase "connected in parallel" indicates the specific element and the other element are connected in parallel electrically.

The external terminal 112 and the external terminal 114 electrically connect to an apparatus outside of the system, such as a load, a charging apparatus and the like, and the electric storage system 100. The electric storage cell 120 to the electric storage cell 128 are connected in series. At least one of the electric storage cell 120 to the electric storage cell 128 may be a secondary battery or a capacitor. At least one of the electric storage cell 120 to the electric storage cell 128 may be a lithium ion battery. At least one of the electric storage cell 120 to the electric storage cell 128 may further include a plurality of electric storage cells connected in series or in parallel inside of the electric storage cell The voltage monitoring circuit 140 measures each voltage of the electric storage cell 120 to the electric storage cell 128. The voltage monitoring circuit 140 may be connected to the external terminal 112, the external terminal 114, the connection point 132, the connection point 134, the connection point 136 and connection point 138 electrically. The voltage monitoring circuit 140 may determine each SOC (State Of Charge) of the electric storage cell 120 to the electric storage cell 128. The voltage monitoring circuit 140 may determine the SOC of each electric storage cell based on a measurement result of voltage of each electric storage cell, and, for example, it may measure a charging electric quantity and a discharging electric quantity of each electric storage cell by using a current detection circuit (not shown in the drawings) and determine the SOC of each electric storage cell based on the result. The voltage monitoring circuit 140 may send information related to at least one of the voltage and SOC of each electric storage cell to the module control section 150.

According to the present embodiment, since the voltage monitoring circuit 140 measures each voltage of a plurality of electric storage cells, even when using a high-precision voltage measurement apparatus at a high cost as the voltage monitoring circuit 140, it can restrain a significant rise of costs for manufacturing the electric storage system 100. The voltage monitoring circuit 140 may be formed in the same chip as the balance correction module 160 and may be also formed in a different chip from the balance correction module 160.

The module control section 150 controls each operation of the balance correction circuit 162 to the balance correction circuit 168. The module control section 150 may be realized according to hardware and may be also realized according to software. Also, it may be also realized according to a combination of hardware and software. For example, the module control section 150 may be realized by conducting a program for controlling the balance correction module 160 in a general information processing apparatus comprising a data processing apparatus and the like which has CPU, ROM, RAM, a communication interface and the like.

The program which is installed to a computer and makes the computer function as the module control section 150 according to the present embodiment may comprise a module prescribing operations of each section of the module control section 150. The programs or modules actuate the CPU and the like and make the computer function respectively as each section of the module control section 150. An information processing described in these programs functions by being read in the computer as a specific means that software and each described-above hardware resource cooperate. Then, according to the specific means, a unique apparatus can be constructed in accordance with a purpose of use by realizing an arithmetic operation or process of information corresponding to the purpose of use of the computer in the present embodiment. The program may have been stored in a computer readable medium and may have also been stored in a storage apparatus connected to a network.

In the present embodiment, the module control section 150 receives information related to at least one of voltage and SOC of each of the electric storage cell 120 to the electric storage cell 128 from the voltage monitoring circuit 140. The module control section 150 generates module control signals 12 to 18 which control the balance correction circuit 162 to the balance correction circuit 168 respectively based on the information related to at least one of voltage and SOC of each of the electric storage cell 120 to the electric storage cell 128. The module control section 150 sends the module control signals 12 to 18 which control the balance correction circuit 162 to the balance correction circuit 168 respectively to the balance correction circuit 162 to the balance correction circuit 168 respectively.

Each of the module control signals 12 to 18 may include at least one of a signal indicating a voltage difference between two electric storage cells being equalization operation objects of a corresponding balance correction circuit (referred to operation object cells in some cases), a signal controlling a timing in which a corresponding balance correction circuit operates, a signal controlling a transferring speed of an electric charge by a corresponding balance correction circuit and a signal prescribing an operation mode of a corresponding balance correction circuit. As an operation mode of the balance correction circuit, the following modes can be exemplified: (1) a normal mode to transfer an electric charge from one electric storage cell with a larger voltage or SOC value between the operation object cells to the other electric storage cell, (2) a forward mode to transfer an electric charge from one electric storage cell on the external terminal 112 side of the operation object cells to the other electric storage cell, (3) a reverse mode to transfer an electric charge from one electric storage cell on the external terminal 114 side of the operation object cells to the other electric storage cell and (4) a stop mode to stop the equalization operation.

It will be described below regarding a case that a module control signal includes a signal prescribing an operation mode of a corresponding balance correction circuit by using some examples. When the voltages or the SOC values of operation object cells of a specific balance correction circuit become the same or when the voltages or the SOC values become smaller than a prescribed value, the module control section 150 may generate a module control signal to make the balance correction circuit be in the stop mode. Accordingly, when the equalization is almost competed, the balance correction circuit can be stopped. As a result, it can reduce a consumption amount of an electric power along with operations of the balance correction module 160.

The module control section 150 may generate a module control signal with regards to a specific balance correction circuit according to the below procedures. At first, an average SOC value (referred to a first average value in some cases) is calculated regarding one or more of electric storage cells disposed between the external terminal 112 and a connection point of operation object cells of a specific balance correction circuit among the electric storage cell 120 to the electric storage cell 128. Next, an average SOC value (referred to a second average value in some cases) is calculated regarding one or more of electric storage cells disposed between the external terminal 114 and the connection point of the operation object cells among the electric storage cell 120 to the electric storage cell 128. After that, size of the first average value is compared with size of the second average value and then a module control signal is generated with regards to a specific balance correction circuit based on the comparison result.

In one embodiment, the module control section 150 may generate a module control signal to make the balance correction circuit be in the forward mode when the first average value is larger than the second average value. Similarly, the module control section 150 may generate a module control signal to make the balance correction circuit be in the reverse mode when the first average value is smaller than the second average value. Accordingly, the specific balance correction circuit can decrease a voltage or SOC of the electric storage cell disposed on the external terminal 112 side and increase a voltage or SOC of the electric storage cell disposed on the external terminal 114 side.

In another embodiment, the module control section 150 may generate a module control signal to make the balance correction circuit be in the forward mode or the stop mode when the first average value is larger than the second average value and the SOC value of the electric storage cell disposed on the external terminal 112 side of the operation object cells is smaller than the SOC value of the other electric storage cell. Similarly, the module control section 150 may generate a module control signal to make the balance correction circuit be in the reverse mode or the stop mode when the first average value is smaller than the second average value and the SOC value of the electric storage cell disposed on the external terminal 112 side of the operation object cells is larger than the SOC value of the other electric storage cell. Accordingly, it can restrain an unnecessary operation of the balance correction module 160 and as a result, a consumption amount of an electric power along with operations of the balance correction module 160 can be reduced.

For example, when a used electric storage cell is used as the electric storage cell 120 to the electric storage cell 128 or when manufactures, production lots and the like are different between the electric storage cell 120 to the electric storage cell 128, after a charging cycle and a discharging cycle are repeated in the electric storage system 100, a variation in SOC values of the electric storage cell 120 to the electric storage cell 128 occurs sometimes. In a case that each of the balance correction circuit 162 to the balance correction circuit 168 operates in the normal mode while a variation in the SOC values of the electric storage cell 120 to the electric storage cell 128 is occurring, there is a possibility that an unnecessary equalization operation is conducted.

A case that the SOC values of the electric storage cell 120, the electric storage cell 122, the electric storage cell 124, the electric storage cell 126 and the electric storage cell 128 are 95%, 35%, 50%, 20% and 20% respectively will be described as an example regarding an unnecessary equalization operation. In this case, when the balance correction circuit 162 to the balance correction circuit 168 operate in the normal mode, an unnecessary equalization operation occurs in the balance correction circuit 164 during the equalization.

After a while from the beginning of the equalization operation, the balance correction circuit 164 transfers an electric charge from the electric storage cell 124 with the SOC value of 50% to the electric storage cell 122 with the SOC value of 35%. During the period, an electric charge is transferred from the electric storage cell 120 to the electric storage cell 122 via the balance correction circuit 162. Also, an electric charge is transferred from the electric storage cell 124 to the electric storage cell 126 via the balance correction circuit 166. Therefore, after a while since the equalization operation begins, the SOC value of the electric storage cell 122 becomes larger than the SOC value of the electric storage cell 124.

When the SOC value of the electric storage cell 122 is larger than the SOC value of the electric storage cell 124, the balance correction circuit 164 transfers an electric charge from the electric storage cell 122 to the electric storage cell 124. Like this, the balance correction circuit 164 transfers an electric charge from the electric storage cell 124 to the electric storage cell 122 once and transfers an electric charge from the electric storage cell 122 to the electric storage cell 124, and an unnecessary equalization operation occurs.

Even if each of the balance correction circuit 162 to the balance correction circuit 168 has a voltage detection function, each of the balance correction circuit 162 to the balance correction circuit 168 may detect a voltage difference of each operation object cell but cannot detect voltages of other electric storage cells. Therefore, a variation in the SOC values of the electric storage cell 120 to the electric storage cell 128 cannot be detected. As a result, an unnecessary equalization operation occurs sometimes.

On the other hand, according to the present embodiment, the module control section 150 generates the module control signals 12 to 18 controlling the balance correction circuit 162 to the balance correction circuit 168 respectively based on information related to at least one of voltage and SOC of each of the electric storage cell 120 to the electric storage cell 128. Therefore, even when there is a variation in the SOC values between the electric storage cell 120 to the electric storage cell 128, it can control each of the balance correction circuit 162 to the balance correction circuit 168 to perform an appropriate operation. As a result, it can restrain an unnecessary equalization operation from occurring.

A case that the module control signal includes a signal controlling a timing in which a corresponding balance correction circuit operates will be described by using some examples. In one embodiment, when determining a corresponding balance correction circuit to operate in the normal mode, the module control section 150 may generate a module control signal to begin operations of the balance correction circuit. Similarly, when determining a corresponding balance correction circuit to be in the stop mode, the module control section 150 may generate a module control signal showing to stop the balance correction circuit.

In another embodiment, when two electric storage cells connected in series are connected to two or more of balance correction circuits in parallel respectively, the module control section 150 may generate the module control signals 12 to 18 so that each output current from two or more of the balance correction circuits connected in parallel has a different waveform or phase from each other. In this case, each ripple current of two or more of the balance correction circuits connected in parallel is at least partially offset according to a waveform synthesization of each output current from two or more of the balance correction circuits connected in parallel. Accordingly, it can reduce noises occurring in the output current of the electric storage system 100.

For example, when a number of the balance correction sections connected in parallel is N wherein the N is an integer equal to or more than two, the module control signals 12 to 18 may be generated so that each of the N of the balance correction circuits outputs an output having a phase difference of 360 degrees/N sequentially. In this case, each ripple current of two or more of the balance correction circuits connected in parallel can be almost offset.

The balance correction module 160 transfers an electric charge between the electric storage cell 120 and the electric storage cell 128 based on the signal from the module control section 150 at least during a charging cycle or a discharging cycle of the electric storage system 100. The balance correction module 160 may be configured by one chip and may be also configured by a plurality of chips.

Each of the balance correction circuit 162 to the balance correction circuit 168 may be a balance correction circuit with an active system. As described in Japanese Application Publication No. 2006-067742, a balance correction circuit with an active system may be a balance correction circuit which transfers an electric charge between two electric storage cells via an inductor and may be also a balance correction circuit which transfers an electric charge by a capacitor, as described in Japanese Application Publication No. 2012-210109.

The balance correction circuit 162 operates based on the module control signal 12 and equalizes voltages of the electric storage cell 120 and the electric storage cell 122. For example, when the balance correction circuit 162 is a circuit which transfers an electric charge through an inductor, the balance correction circuit 162 may comprise a first terminal, a second terminal, a third terminal and a signal input terminal. The first terminal is connected to a terminal on the external terminal 112 side of the electric storage cell 120 electrically, the second terminal is connected to a terminal on the external terminal 114 side of the electric storage cell 122 electrically and the a third terminal is connected to the connection point 132 of the electric storage cell 120 and the electric storage cell 122 electrically. Also, the module control signal 12 from the module control section 150 is input in the signal input terminal.

Similarly, the balance correction circuit 164 operates based on the module control signal 14 and equalizes voltages of the electric storage cell 122 and the electric storage cell 124. The balance correction circuit 166 operates based on the module control signal 16 and equalizes voltages of the electric storage cell 124 and the electric storage cell 126. The balance correction circuit 168 operates based on the module control signal 18 and equalizes voltages of the electric storage cell 126 and the electric storage cell 128.

Figure 2:
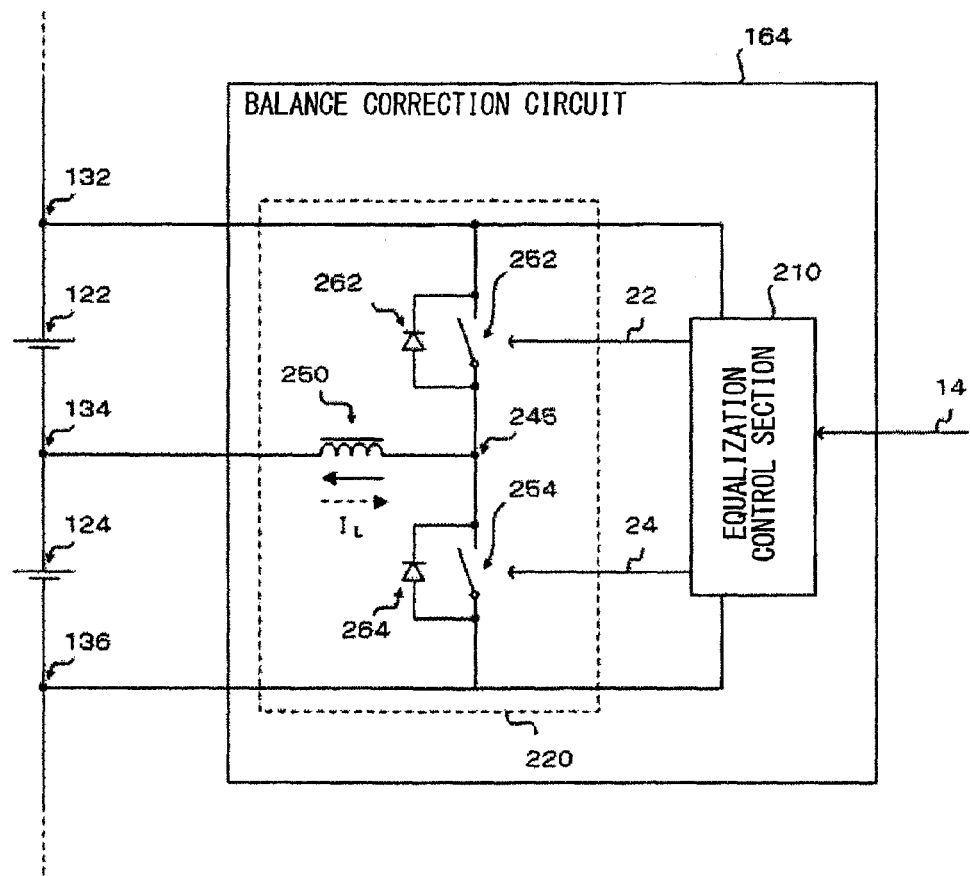
FIG. 2 shows an example of in internal configuration of a balance correction circuit 164 schematically.

FIG. 2 shows an example of the internal configuration of the balance correction circuit 164 schematically. Further, the balance correction circuit 162, the balance correction circuit 166 and the balance correction circuit 168 may comprise the same internal configuration as that of the balance correction circuit 164.

In the present embodiment, the balance correction circuit 164 comprises an equalization control section 210 and an equalization operation section 220. The equalization operation section 220 comprises an inductor 250, a switching element 252, a switching element 254, a diode 262 and a diode 264. Further, the balance correction circuit 164 may comprise a voltage detection section (not shown in the drawings) which detects each voltage of the electric storage cell 122 and the electric storage cell 124. The equalization control section 210 may be an example of the control section. The equalization operation section 220 may be an example of the first balance correction section or the second balance correction section.

In the present embodiment, the balance correction circuit 164 is connected to the positive electrode side of the electric storage cell 122, the connection point 134 of the negative electrode side of the electric storage cell 122 and the positive electrode side of the electric storage cell 124 and the negative electrode side of the electric storage cell 124 electrically. Accordingly, a first switching circuit including the electric storage cell 122, the switching element 252 and the Inductor 250 is formed. Also, a second switching circuit including the electric storage cell 124, the inductor 250 and the switching element 254 is formed. The electric storage cell 122 and the electric storage cell 124 may be an example of two adjacent electric storage cells.

The equalization control section 210 controls operations of the equalization operation section 220. The equalization control section 210 supplies an equalization control signal 22 which controls an ON/OFF operation of the switching element 252 to the switching element 252. The equalization control section 210 supplies an equalization control signal 24 which controls an ON/OFF operation of the switching element 254 to the switching element 254. The equalization control signal 22 and the equalization control signal 24 may be an example of the first control signal or the second control signal.

The equalization control section 210 may generate the equalization control signal 22 and the equalization control signal 24 by a pulse generator which causes a pulse train of a prescribed cycle. The pulse generator may be a changeable pulse generator which variably controls at least one of duty ratios of the equalization control signal 22 and the equalization control signal 24. The duty ratio can be calculated as a proportion of an ON period with regards to a period of a square wave.

The equalization control section 210 may supply the equalization control signal 22 and the equalization control signal 24 so that the switching element 252 and the switching element 254 repeat the ON/OFF operation alternately. Accordingly, a switching operation is repeated, wherein a state of a current flowing through the first switching circuit and a state of a current flowing through the second switching circuit switch alternately.

The equalization control section 210 may supply the equalization control signal 22 and the equalization control signal 24 to the switching element 252 and the switching element 254 so that the balance correction circuit 164 repeats the switching operation in a prescribed period. Here, "a prescribed period" includes not only a prescribed period to repeat the switching operation but also a case of changing the period by some control. For example, a case of determining a period for a next cycle based on a specific algorithm is included.

The switching operation may include a first operation that one switching element of the switching element 252 and the switching element 254 performs an ON operation and the other switching element performs an OFF operation and a second operation that the one switching element performs the OFF operation and the other switching element performs the ON operation. In addition to the first operation and the second operation, the switching operation may include a third operation that both the switching element 252 and the switching element 254 perform the OFF operation. An operation sequence of the first operation, the second operation and the third operation may be determined optionally, but it is preferable to continue to conduct the second operation after the first operation. Further, the switching operation may include other operations.

The equalization control section 210 receives the module control signal 14 from the module control section 150. The equalization control section 210 may generate the equalization control signal 22 and the equalization control signal 24 based on the module control signal 14. For example, when a signal prescribing an operation mode of the balance correction circuit 164 (referred to a mode selection signal in some cases) is included in the module control signal 14, the equalization control section 210 generates the equalization control signal 22 and the equalization control signal 24 so that the balance correction circuit 164 operates in the operation mode prescribed by the mode selection signal.

For example, when making the balance correction circuit 164 operate in the normal mode, the equalization control section 210 may adjust the duty ratios of the equalization control signal 22 and the equalization control signal 24 so that the duty ratios of the equalization control signal 22 and the equalization control signal 24 become the same. Accordingly, the balance correction circuit 164 repeats the switching operation and then an electric charge is transferred from an electric storage cell with a larger voltage or SOC value to the other electric storage cell. For example, when each duty ratio of the equalization control signal 22 and the equalization control signal 24 is 50%, the balance correction circuit 164 repeats the switching operation until the voltages of the electric storage cell 122 and the electric storage cell 124 become the same.

Also, when making the balance correction circuit 164 operate in the normal mode, the equalization control section 210 adjusts the duty ratios of the equalization control signal 22 and the equalization control signal 24 so that an ON time of a switching element corresponding to one electric storage cell with a larger voltage or SOC value between the operation object cells of the balance correction circuit 164 becomes longer than an ON time of a switching element corresponding to the other electric storage cell. According to the present embodiment, once the duty ratios of the equalization control signal 22 and the equalization control signal 24 are controlled to be the same, even when a voltage difference between the electric storage cell 122 and the electric storage cell 124 is not zero in a balance state due to a manufacturing error and the like in the switching element 252 and the switching element 254, a timing in which the voltage difference between the electric storage cell 122 and the electric storage cell 124 becomes zero can be made. As a result, the balance correction circuit 164 can be stopped at a timing in which the voltage difference between the electric storage cell 122 and the electric storage cell 124 becomes zero or a timing in which the voltage difference becomes extremely small.

Similarly, when making the balance correction circuit 164 operate in the forward mode, the equalization control section 210 adjusts the duty ratios of the equalization control signal 22 and the equalization control signal 24 so that an ON time of a switching element corresponding to the electric storage cell on the external terminal 112 side between the operation object cells of the balance correction circuit 164 becomes longer than an ON time of a switching element corresponding to the other electric storage cell. When making the balance correction circuit 164 operate in the reverse mode, the equalization control section 210 adjusts the duty ratios of the equalization control signal 22 and the equalization control signal 24 so that an ON time of a switching element corresponding to the electric storage cell on the external terminal 114 side between the operation object cells of the balance correction circuit 164 is longer than an ON time of a switching element corresponding to the other electric storage cell.

When making the balance correction circuit 164 be in the stop mode, the equalization control section 210 generates the equalization control signal 22 for making the switching element 252 perform the OFF operation and the equalization control signal 24 for making the switching element 254 perform the OFF operation. Further, when information regarding a voltage difference between the electric storage cell 122 and the electric storage cell 124 is included in the module control signal 14, the equalization control section 210 may determine a timing of stopping the balance correction circuit 164 based on the voltage difference.

The inductor 250 is connected to the electric storage cell 122 and the switching element 252 in series at an interval between the electric storage cell 122 and the switching element 252 and transfers an electric charge between the electric storage cell 122 and the electric storage cell 124. In the present embodiment, one end of the inductor 250 is connected to the connection point 134 of the electric storage cell 122 and the electric storage cell 124 electrically. The other end of the inductor 250 is connected to the connection point 245 of the switching element 252 and the switching element 254 electrically. The switching element 252 and the switching element 254 repeat the ON operation and the OFF operation (referred to the ON/OFF operation in some cases) alternately and then an inductor current $I_L$ occurs at the inductor 250. Accordingly, an electric energy can be delivered via the inductor between the electric storage cell 122 and the electric storage cell 124. As a result, it can equalize voltages of the electric storage cell 122 and the electric storage cell 124.

The switching element 252 is connected at an interval between the other end of the inductor 250 and the positive electrode side of the electric storage cell 122 electrically. The switching element 252 receives the equalization control signal 22 from the equalization control section 210 and performs the ON operation or the OFF operation based on the equalization control signal 22. Accordingly, the first switching circuit is opened and closed. The switching element 252 may be a transistor such as a MOSFET and the like.

The switching element 254 is connected at an interval between the other end of the inductor 250 and the negative electrode side of the electric storage cell 124 electrically. The switching element 254 receives the equalization control signal 24 from the equalization control section 210 and performs the ON operation or the OFF operation based on the equalization control signal 24. Accordingly, the second switching circuit is opened and closed. The switching element 254 may be a transistor such as a MOSFET and the like.

The diode 262 is disposed parallel to the switching element 252 and flows a current in a direction from the other end of the inductor 250 to the positive electrode side of the electric storage cell 122. The diode 264 is disposed parallel to the switching element 254 and flows a current in a direction from the negative electrode side of the electric storage cell 124 to the other end of the inductor 250. The diode 262 and the diode 264 may be parasitic diodes formed equivalently between a source and a drain of a MOSFET.

By disposing the diode 262 and the diode 264, even when the inductor current $I_L$ is residual during a period in which both the switching element 252 and the switching element 254 are in the OFF state, the inductor current $I_L$ can keep flowing via the diode 262 or the diode 264. Accordingly, the inductor current $I_L$ once occurring at the inductor 250 can be used without any waste. Also, it can restrain a surge voltage from occurring when shutting off the inductor current $I_L$.

In the present embodiment, a case that the equalization control section 210 of the balance correction circuit 164 generates the equalization control signal 22 and the equalization control signal 24 is described. However, the balance correction circuit 164 is not limited to the present embodiment. The balance correction circuit 164 may not have the equalization control section 210. In this case, the switching element 252 and the switching element 254 may operate based on the equalization control signal 22 and the equalization control signal 24 generated by the module control section 150.

In the present embodiment, a case that the module control section 150 generates the module control signal 14 and the equalization control section 210 generates the equalization control signal 22 and the equalization control signal 24 based on the module control signal 14 is described. However, the balance correction circuit 164 is not limited to the present embodiment. The equalization control section 210 may generate the equalization control signal 22 and the equalization control signal 24 by receiving information from the voltage monitoring circuit 140 and performing the same process as that the module control section 150 performs with regards to the received information.

In the present embodiment, a case that the balance correction circuit 164 equalizes voltages of the electric storage cell 122 and the electric storage cell 124 is described. However, the balance correction circuit 164 is not limited to the present embodiment. The balance correction circuit 164 may equalize voltages of two electric storage cells which are not adjacent to each other, like the electric storage cell 122 and the electric storage cell 128. In this case, one end of the inductor 250 is connected to a connection point of the electric storage cell 122 and the electric storage cell 128. Also, the switching element 254 is connected at an interval between the other end of the inductor 250 and the negative electrode side of the electric storage cell 128 electrically. In another embodiment, the balance correction circuit 164 may equalize an in-series voltage of the electric storage cell 122 and the electric storage cell 124 and an in-series voltage of the electric storage cell 124 and the electric storage cell 126. In this case, one end of the inductor 250 is connected to the connection point 134 of the electric storage cell 122 and the electric storage cell 124. Also, the switching element 252 is connected between the other end of the inductor 250 and the positive electrode side of the electric storage cell 120 electrically and the switching element 254 is connected between the other end of the inductor 250 and the negative electrode side of the electric storage cell 126 electrically.

Another example of the balance correction circuit 164 will be described below by using FIGS. 3, 4 and 5. Further, the balance correction circuit 162, the balance correction circuit 166 and the balance correction circuit 168 may have the same internal configuration as that of the balance correction circuit 164.

Figure 3:
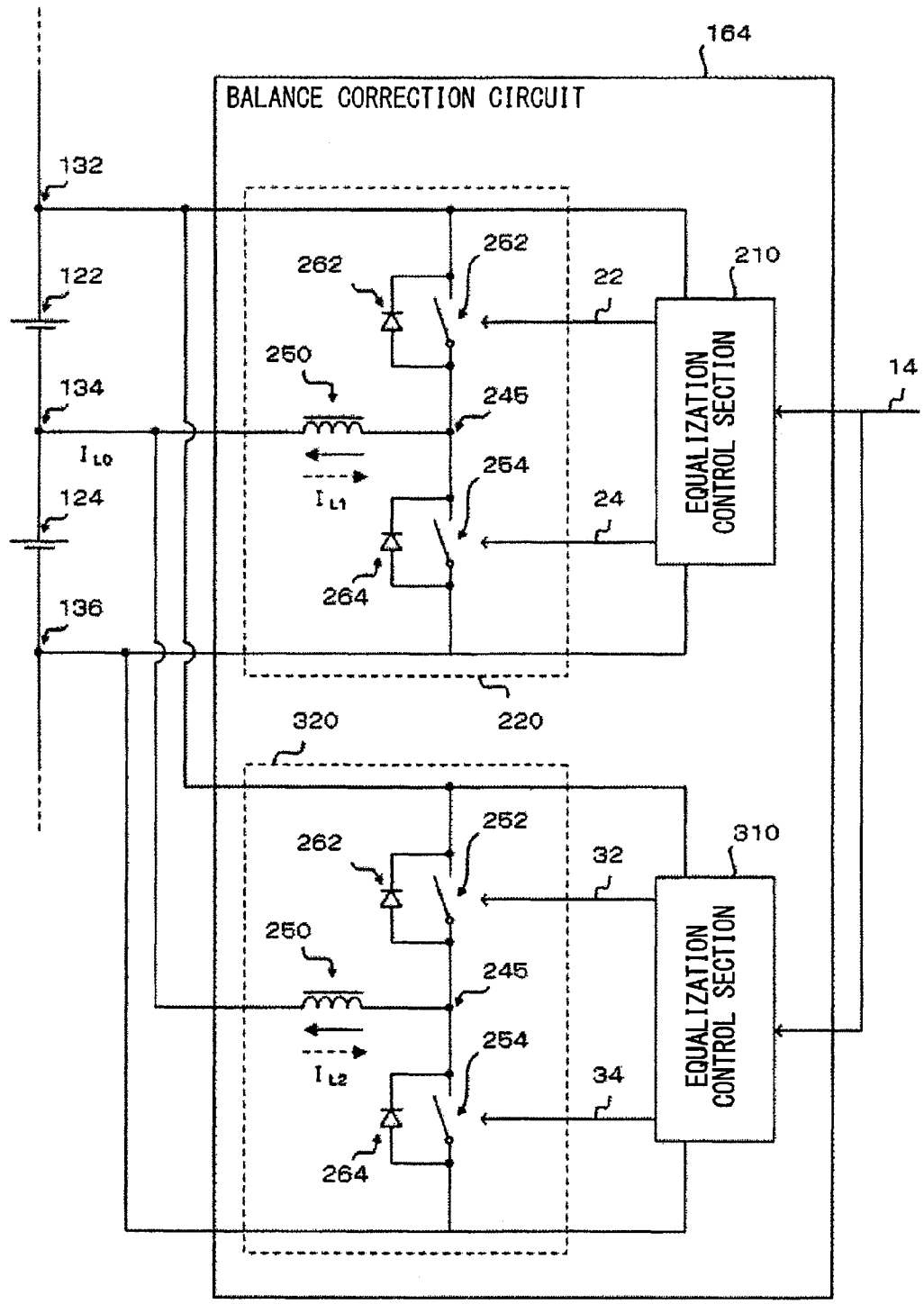
FIG. 3 shows another example of the internal configuration of the balance correction circuit 164 other examples schematically.

FIG. 3 shows another example of the internal configuration of the balance correction circuit 164 schematically. FIG. 4 schematically shows one example of a signal output by the equalization control section 210 and the equalization control section 310 in the balance correction circuit 164 relatedly described in FIG. 3. FIG. 5 schematically shows one example of a waveform of a current flowing during the equalization operation of the electric storage cell 122 and the electric storage cell 124 in the balance correction circuit 164 relatedly described in FIG. 3.

As shown in FIG. 3, the balance correction circuit 164 according to the present embodiment is different from the balance correction circuit 164 relatedly described in FIG. 2 in comprising the equalization control section 310 and the equalization operation section 320. The equalization control section 310 may be one example of the control section. The equalization operation section 320 may be one example of the first balance correction section or the second balance correction section.

The equalization control section 310 comprises the same configuration as that of the equalization control section 210 and controls the equalization operation section 320. The equalization control section 310 receives the module control signal 14 from the module control section 150. The equalization control section 310 may generate the equalization control signal 32 and the equalization control signal 34 based on the module control signal 14. For example, when the mode selection signal is included in the module control signal 14, the equalization control section 310 generates the equalization control signal 32 and the equalization control signal 34 so that the balance correction circuit 164 operates in an operation mode prescribed by the mode selection signal.

In the present embodiment, the module control signal 14 includes signals for adjusting phases of the equalization control signal 22, the equalization control signal 24, the equalization control signal 32 and the equalization control signal 34. The equalization control section 210 and the equalization control section 310 generate the equalization control signal 22, the equalization control signal 24, the equalization control signal 32 and the equalization control signal 34 based on the module control signal 14 so that an inductor current $I_{L1}$ which flows through an inductor 250 of the equalization operation section 220 and an inductor current $I_{L2}$ which flows through an inductor 250 of the equalization operation section 320 have different waveforms or phases from each other.

In the present embodiment, since the balance correction circuit 164 comprises two equalization operation sections, it is preferable to generate the equalization control signal 22, the equalization control signal 24, the equalization control signal 32 and the equalization control signal 34 so that the phase difference between the inductor current $I_{L1}$ and the inductor current $I_{L2}$ becomes 360/2=180 [degrees]. In this case, since waveforms of the output currents from the equalization operation section 220 and the equalization operation section 320 respectively to the connection points of the operation object cells are synthesized, each ripple current of the output currents is almost offset. As a result, it can particularly decrease amplitude of a waveform of a current $I_{L0}$ which flows through the connection point 134 of the electric storage cell 122 and the electric storage cell 124.

The equalization operation section 320 is connected to the electric storage cell 122 and the electric storage cell 124 electrically so that the electric storage cell 122, the electric storage cell 124, the equalization operation section 220 and the equalization operation section 320 are connected in parallel, wherein the electric storage cell 122 and the electric storage cell 124 are connected in series. Accordingly, comparing with the balance correction circuit 164 relatedly described in FIG. 2, it can enhance a transferring speed of electric charges between two electric storage cells. Also, it can decrease the amplitude of the waveform of the current $I_{L0}$ which flows through the connection point 134 of the electric storage cell 122 and the electric storage cell 124 by adjusting the phases of the equalization control signal 22, the equalization control signal 24, the equalization control signal 32 and the equalization control signal 34.

One end of the inductor 250 of the equalization operation section 320 is electrically connected to the connection point 134 of the electric storage cell 122 and the electric storage cell 124. The other end of the inductor 250 of the equalization operation section 320 is electrically connected to the connection point 245 of the switching element 252 and the switching element 254 of the equalization operation section 320.

The switching element 252 of the equalization operation section 320 is electrically connected between the other end of the inductor 250 of the equalization operation section 320 and the positive electrode side of the electric storage cell 122. The switching element 252 of the equalization operation section 320 received the equalization control signal 32 from the equalization control section 310 and performs the ON operation or the OFF operation based on the equalization control signal 32.

The switching element 254 of the equalization operation section 320 is electrically connected between the other end of the inductor 250 of the equalization operation section 320 and the negative electrode side of the electric storage cell 124. The switching element 254 of the equalization operation section 320 receives the equalization control signal 34 from the equalization control section 210 and performs the ON operation or the OFF operation based on the equalization control signal 34.

In the present embodiment, a case that the balance correction circuit 164 comprises two equalization operation sections connected to the electric storage cell 122 and the electric storage cell 124 in parallel is described. However, the balance correction circuit 164 is not limited to the present embodiment. The balance correction circuit 164 may comprise N of the equalization operation sections connected to the electric storage cell 122 and the electric storage cell 124 in parallel. Further, the N is an integer equal to or more than two. The N of the equalization operation sections may be sorted in M of groups. Further, the M may be an integer more than one and equal to or less than the N. Also, the N is preferable to be a multiple of the M (including one time as many as the M)

In this case, each of N of the equalization operation sections may be controlled so that a phase difference between inductor currents output from two different groups among M of the groups becomes a multiple of 360/M [degrees] (including one time as many as the M). For example, in the balance correction circuit 164 of FIG. 3, when the equalization operation section 220 and the equalization operation section 320 are controlled so that the phase difference between the inductor current $I_{L1}$ and the inductor current $I_{L2}$ becomes 180 [degrees], N=2 and M=2.

Also, as an example, in a case that the balance correction circuit 164 comprises six equalization operation sections A to F, the six equalization operation sections A to F are sorted in a first group comprising A and B, a second group comprising C and D and a third group comprising E and F, for example. By controlling the six equalization operation sections A to F so that a phase difference between inductor currents output from two different groups among the three groups becomes 360/3=120 [degrees], a ripple current of an output current from each equalization operation section can be almost offset. In this case, the phase difference between the inductor currents output from the equalization operation sections including in the same group (for example, the equalization operation sections A and B) is 0 [degrees], the phase difference between the inductor current output from the equalization operation section A or B and the inductor current output from the equalization operation section C or D is 120 [degrees], the phase difference between the inductor current output from the equalization operation section A or B and the inductor current output from the equalization operation section E or F is 240 [degrees] and the phase difference between the inductor current output from the equalization operation section C or D and the inductor current output from the equalization operation section E or F is 120 [degrees].

It will be described below by using FIGS. 4 and 5 regarding a case that the equalization control section 210 and the equalization control section 310 generate the equalization control signal 22, the equalization control signal 24, the equalization control signal 32 and the equalization control signal 34 so that the phase difference between the inductor current $I_{L1}$ and the inductor current $I_{L2}$ becomes 180 degrees. FIG. 4 shows one example of waveforms of the equalization control signal 22, the equalization control signal 24, the equalization control signal 32 and the equalization control signal 34 schematically. FIG. 5 shows a changewith-time of current values of the current $I_{L0}$ which flows through the connection point 134 of the electric storage cell 122 and the electric storage cell 124. FIG. 5 schematically shows one example of waveforms of the current $I_{L0}$, the inductor current $I_{L1}$ and the inductor current $I_{L2}$ in a circle shown in dotted line.

Figure 4:
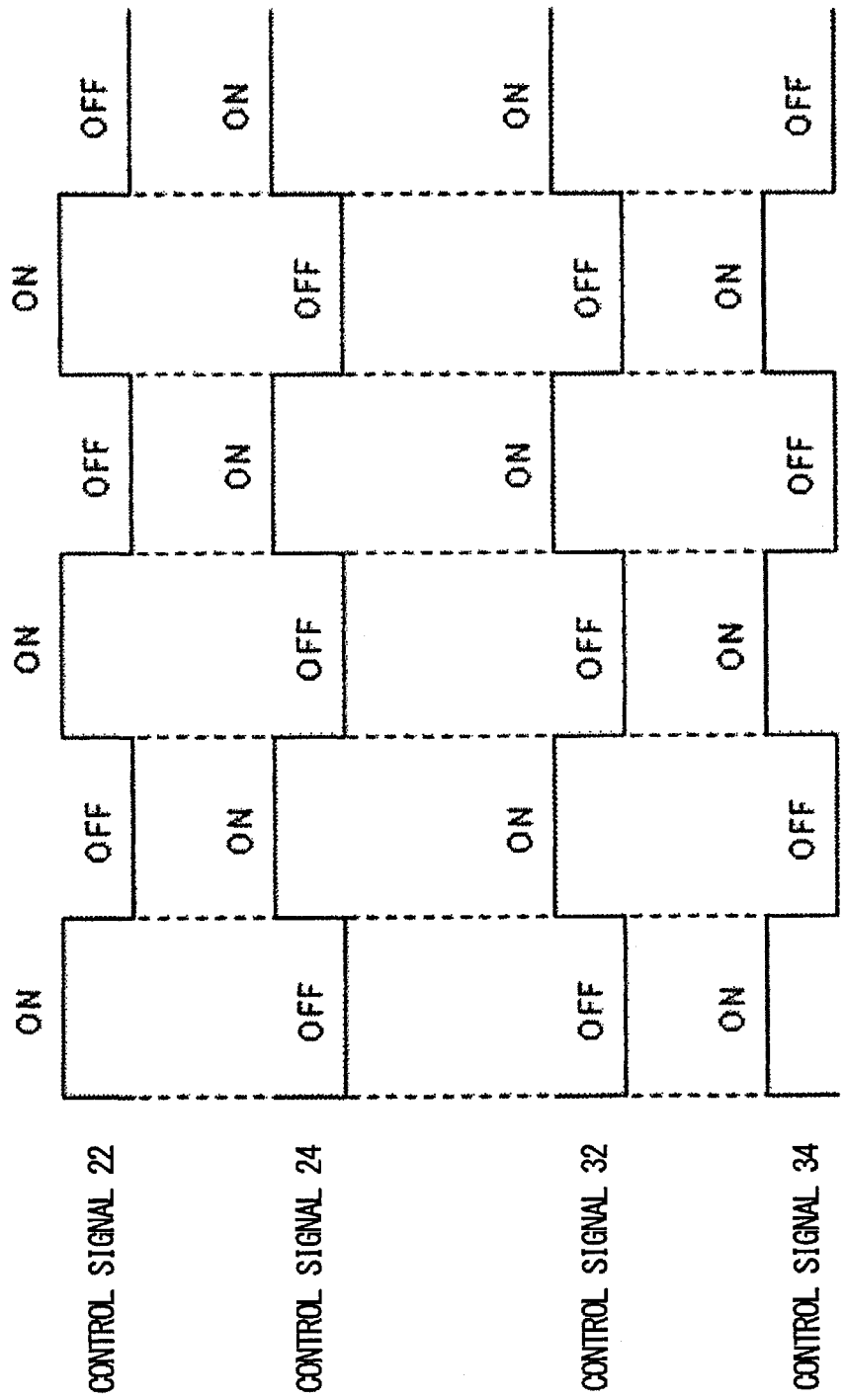
FIG. 4 shows an example of signals output from an equalization control section 210 and an equalization control section 310 schematically.
Figure 5:
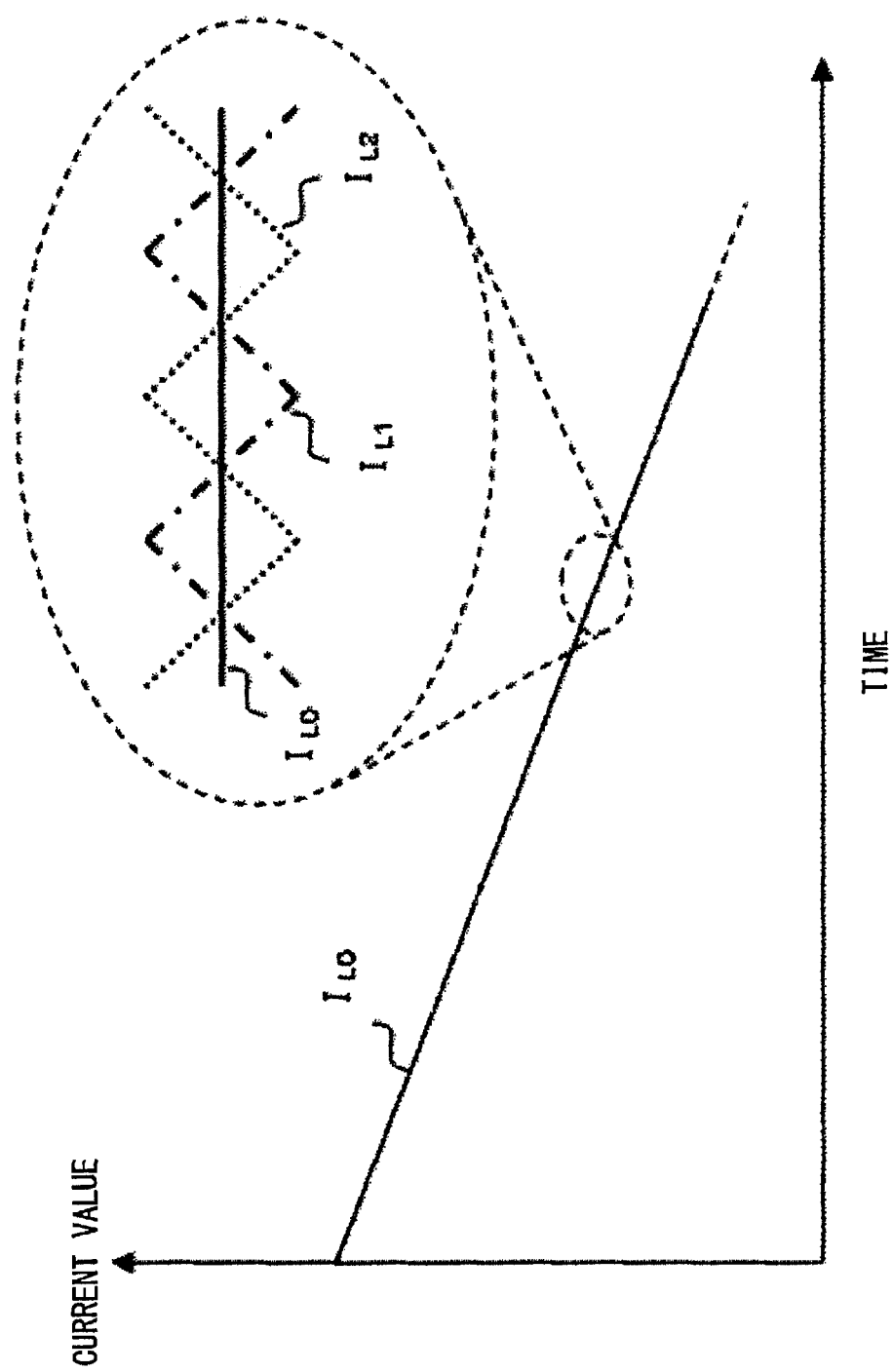
FIG. 5 shows an example of a waveform of a current flowing during an equalization operation of an electric storage cell 122 and an electric storage cell 124 schematically.

As shown in FIG. 4, the phase difference between the equalization control signal 22 and the equalization control signal 32 is 180 degrees and the phase difference between the equalization control signal 24 and the equalization control signal 34 is 180 degrees. In this case, as shown in FIG. 5, the inductor current $I_{L1}$ and the inductor current $I_{L2}$ are output sequentially. Also, the phase difference between the inductor current $I_{L1}$ and the inductor current $I_{L2}$ is 180 degrees. As a result, the amplitude of the current $I_{L0}$ becomes almost zero. According to the present embodiment, since it can restrain the amplitude of the current $I_{L0}$ flowing through the connection point 134 of the electric storage cell 122 and the electric storage cell 124, it can reduce noises occurring in output currents of the electric storage system 100.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

Also, it is apparent that the below technical ideas are described in the specification of the present application.
(Item 1)
A balance correction apparatus comprising:
a first balance correction section which equalizes voltages of two electric storage cells among a plurality of electric storage cells connected in series;
a second balance correction section which equalizes voltages of two electric storage cells among the plurality of the electric storage cells; and
a control section which controls operations of the first balance correction section and the second balance correction section, wherein
the control section generates a first control signal which controls operations of the first balance correction section and a second control signal which controls the second balance correction section based on each SOC (State Of Charge) of the plurality of the electric storage cells.
(Item 2)
The balance correction apparatus according to item 1, wherein
the first balance correction section equalizes voltages of a first electric storage cell and a second electric storage cell included in the plurality of the electric storage cells,
a negative electrode of the first electric storage cell and a positive electrode of the second electric storage cell are connected to each other, and
the control section compares a first value with a second value and generates the first control signal based on a result of the comparison, wherein
the first value is obtained by averaging SOC values of one or more of electric storage cells among the plurality of the electric storage cells, which is or are disposed between one end of the positive electrode side of the plurality of the electric storage cells and a connection point of the first electric storage cell and the second electric storage cell, and
the second value is obtained by averaging SOC values of one or more of electric storage cells among the plurality of the electric storage cells, which is or are disposed between one end of the negative electrode side of the plurality of the electric storage cells and the connection point of the first electric storage cell and the second electric storage cell.
(Item 3)
The balance correction apparatus according to item 1 or 2, wherein
the control section generates the first control signal to decrease a voltage or SOC of the first electric storage cell and to increase a voltage or SOC of the second electric storage cell when the first value is larger than the second value.
(Item 4)
The balance correction apparatus according to any one of items 1 to 3, wherein
the control section generates the first control signal to stop operations of the first balance correction section when the first value is larger than the second value and a SOC value of the first electric storage cell is smaller than a SOC value of the second electric storage cell.
(Item 5)
An electric storage system comprising:
a plurality of electric storage cells connected in series; and
the balance correction apparatus according to any one of items 1 to 4, which equalizes voltages of the plurality of the electric storage cells.
(Item 6)
The electric storage system according to item 5, further comprising:
a voltage measurement section which measures each voltage of the plurality of the electric storage cells.
(Item 7)
A program for making a computer perform:
a procedure of receiving each voltage or SOC value of a plurality of electric storage cells connected in series; and
a procedure of generating a first control signal which controls operations of a first balance correction section and a second control signal which controls operations of a second balance correction section based on the voltages or the SOC values, wherein
the computer is for controlling operations of a balance correction circuit which comprises the first balance correction section and the second balance correction section, and wherein
the first balance correction section equalizes voltages of two electric storage cells among the plurality of the electric storage cells, and
the second balance correction section equalizes voltages of two electric storage cells among the plurality of the electric storage cells.
(Item 8)
A control apparatus for controlling operations of a balance correction circuit, comprising:
a receiving section which receives each voltage or SOC value of a plurality of electric storage cells connected in series; and
a control signal generation section which generates a first control signal controlling operations of a first balance correction section and a second control signal controlling operations of a second balance correction section based on the voltages or the SOC values, wherein
the balance correction circuit comprises:
the first balance correction section which equalizes voltages of two electric storage cells among the plurality of the electric storage cells; and the second balance correction section which equalizes voltages of two electric storage cells among the plurality of the electric storage cells.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 12 module control signal; 14 module control signal; 16 module control signal; 18 module control signal; 22 equalization control signal; 24 equalization control signal; 32 equalization control signal; 34 equalization control signal; 100 electric storage system; 112 external terminal; 114 external terminal; 120 electric storage cell; 122 electric storage cell; 124 electric storage cell; 126 electric storage cell; 128 electric storage cell; 132 connection point; 134 connection point; 136 connection point; 138 connection point; 140 voltage monitoring circuit; 150 module control section; 160 balance correction module; 162 balance correction circuit; 164 balance correction circuit; 166 balance correction circuit; 168 balance correction circuit; 210 equalization control section; 220 equalization operation section; 245 connection point; 250 inductor; 252 switching element; 254 switching element; 262 diode; 264 diode; 310 equalization control section; 320 equalization operation section

What is claimed is:

1. A balance correction apparatus comprising:
a first balance correction section which equalizes voltages of two electric storage cells among a plurality of electric storage cells connected in series;
a second balance correction section which equalizes voltages of two electric storage cells among the plurality of electric storage cells; and
a control section which controls operations of the first balance correction section and the second balance correction section, wherein
the control section generates a first control signal which controls operations of the first balance correction section and a second control signal which controls operations of the second balance correction section based on a measurement result of each voltage of the plurality of electric storage cells,
the first balance correction section equalizes voltages of a first electric storage cell and a second electric storage cell included in the plurality of electric storage cells,
the second balance correction section equalizes voltages of the first electric storage cell and the second electric storage cell, and
the first balance correction section and the second balance correction section are respectively connected to the first electric storage cell and the second electric storage cell electrically so that the first balance correction section, the second balance correction section, the first electric storage cell and the second electric storage cell are connected in parallel, wherein
the first electric storage cell and the second electric storage cell are connected in series.

2. A balance correction apparatus comprising:
a first balance correction section which equalizes voltages of a first electric storage cell and a second electric storage cell connected in series based on a first control signal; and
a second balance correction section which equalizes voltages of the first electric storage cell and the second electric storage cell based on a second control signal, wherein
the first balance correction section and the second balance correction section are respectively connected to the first electric storage cell and the second electric storage cell electrically so that the first balance correction section, the second balance correction section, the first electric storage cell and the second electric storage cell are connected in parallel, wherein
the first electric storage cell and the second electric storage cell are connected in series,
a first control signal and a second control signal are generated respectively so that a first current and a second current have different waveforms or phases from each other,
the first current flows through a connection point of the first electric storage cell and the second electric storage cell via the first balance correction section, and
the second current flows through a connection point of the first electric storage cell and the second electric storage cell via the second balance correction section.

3. The balance correction apparatus according to claim 1, wherein
a first control signal and a second control signal are generated respectively so that a first current and a second current have different waveforms or phases from each other, wherein
the first current flows through a connection point of the first electric storage cell and the second electric storage cell via the first balance correction section, and
the second current flows through a connection point of the first electric storage cell and the second electric storage cell via the second balance correction section.

4. The balance correction apparatus according to claim 3, wherein
a first control signal and a second control signal are generated respectively so that a phase difference between the first current and the second current becomes a multiple of 360 degrees/M when a number of balance correction sections connected to the first electric storage cell and the second electric storage cell in parallel is N and N of the balance correction sections connected in parallel are sorted in M of groups, wherein
the N is an integer equal to or more than two, and
the M is an integer more than one and equal to or less than the N.

5. The balance correction apparatus according to claim 1, wherein
a first control signal and a second control signal respectively comprise operation mode selection signals which prescribe operation modes of the first balance correction section and the second balance correction section respectively.

6. An electric storage system comprising:
a first electric storage cell and a second electric storage cell connected in series; and
the balance correction apparatus according to claim 1, which equalizes voltages of the first electric storage cell and the second electric storage cell.

7. The electric storage system according to claim 6, further comprising:

a plurality of electric storage cells connected in series including the first electric storage cell and the second electric storage cell; and a voltage measurement section which measures each voltage of the plurality of electric storage cells.

8. The balance correction apparatus according to claim 2, wherein a first control signal and a second control signal are generated respectively so that a phase difference between the first current and the second current becomes a multiple of 360 degrees/M when a number of balance correction sections connected to the first electric storage cell and the second electric storage cell in parallel is N and N of the balance correction sections connected in parallel are sorted in M of groups, wherein the N is an integer equal to or more than two, and the M is an integer more than one and equal to or less than the N.

9. The balance correction apparatus according to claim 2, wherein a first control signal and a second control signal respectively comprise operation mode selection signals which prescribe operation modes of the first balance correction section and the second balance correction section respectively.

10. An electric storage system comprising:

a first electric storage cell and a second electric storage cell connected in series; and the balance correction apparatus according to claim 2, which equalizes voltages of the first electric storage cell and the second electric storage cell.

11. The electric storage system according to claim 10, further comprising:

a plurality of electric storage cells connected in series including the first electric storage cell and the second electric storage cell; and a voltage measurement section which measures each voltage of the plurality of electric storage cells.

12. A balance correction apparatus, comprising:

a first balance correction section which equalizes voltages of two electric storage cells among a plurality of electric storage cells connected in series;

a second balance correction section which equalizes voltages of two electric storage cells among the plurality of electric storage cells; and a control section which controls operations of the first balance correction section and the second balance correction section, wherein the control section generates a first control signal which controls operations of the first balance correction section and a second control signal which controls operations of the second balance correction section based on each SOC (State Of Charge) of the plurality of electric storage cells, the first balance correction section equalizes voltages of a first electric storage cell and a second electric storage cell included in the plurality of electric storage cells, a negative electrode of the first electric storage cell is connected to a positive electrode of the second electric storage cell, and the control section compares a first value with a second value and generates the first control signal based on a result of the comparison, wherein the first value is obtained by averaging SOC values of one or more of electric storage cells among the plurality of electric storage cells, which is or are disposed between one end of the positive electrode side of the plurality of electric storage cells and a connection point of the first electric storage cell and the second electric storage cell, and the second value is obtained by averaging SOC values of one or more of electric storage cells among the plurality of electric storage cells, which is or are disposed between one end of the negative electrode side of the plurality of electric storage cells and a connection point of the first electric storage cell and the second electric storage cell.

13. The balance correction apparatus according to claim 12, wherein the control section generates the first control signal so that a voltage or SOC of the first electric storage cell is decreased and a voltage or SOC of the second electric storage cell is increased when the first value is larger than the second value.

14. The balance correction apparatus according to claim 12, wherein the control section generates the first control signal so that operations of the first balance correction section is stopped when the first value is larger than the second value and a SOC value of the first electric storage cell is smaller than a SOC value of the second electric storage cell.

15. An electric storage system comprising:

a plurality of electric storage cells connected in series; and the balance correction apparatus according to claim 12, which equalizes voltages of the plurality of electric storage cells.

16. The electric storage system according to claim 15, further comprising:

a voltage measurement section which measures each voltage of the plurality of electric storage cells.

* * * * *